United States Patent
Olson et al.

(10) Patent No.: US 6,622,240 B1
(45) Date of Patent: Sep. 16, 2003

(54) METHOD AND APPARATUS FOR PRE-BRANCH INSTRUCTION

(75) Inventors: Timothy Alan Olson, Austin, TX (US); James S. Blomgren, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/496,008

(22) Filed: Feb. 1, 2000

Related U.S. Application Data

(60) Provisional application No. 60/140,265, filed on Jun. 18, 1999.

(51) Int. Cl.$^7$ ................................................ G06F 9/38
(52) U.S. Cl. ........................................ 712/233; 712/237
(58) Field of Search ............................... 712/229, 233, 712/234, 237, 239

(56) References Cited

U.S. PATENT DOCUMENTS

| | | | | |
|---|---|---|---|---|
| 5,485,587 A | * | 1/1996 | Matsuo et al. ............... | 712/234 |
| 5,706,490 A | | 1/1998 | Beard et al. | |
| 5,729,727 A | * | 3/1998 | Suzuki ........................ | 712/233 |
| 5,784,603 A | | 7/1998 | Leung et al. | |
| 5,978,904 A | * | 11/1999 | Matsuo et al. ............... | 712/233 |
| 5,996,069 A | | 11/1999 | Yasoshima et al. | |
| 6,185,668 B1 | * | 2/2001 | Arya ........................... | 712/23 |
| 6,185,676 B1 | * | 2/2001 | Poplingher et al. ......... | 712/239 |
| 6,374,348 B1 | * | 4/2002 | Irie et al. ..................... | 712/237 |
| 6,477,639 B1 | * | 11/2002 | Krishnan et al. ............ | 712/237 |

OTHER PUBLICATIONS

Brad Calder and Dirk Grunwald, Fast & Accurate Instruction Fetch and Branch Prediction, 1994 Intl. Symp. on Computer Achitecture, Mar. 1994, Chicago, Illinois.

Scott McFarling, Combining Branch Predictors, WRL Technical Note TN–36, Jun. 1993, pp. 1–20, Western Research Laboratory, Palo Alto, California.

Zhendong Su and Min Zhou, A Comparative Analysis of Branch Prediction Schemes, CS252 Graduate Copmputer Architecture Class Project, Fall 1995, Computer Science Division, University of California at Berkely, http://www.cs-.berkeley. edu/~zhendong/cs252/cs252.html.

Mark Brehob, Travis Doom, Richard Enbody, William H. Moore, Sherry Q. Moore, Ron Sass, Charles Severance, Beyond RISC—The Post–RISC Architecture, Technical Report CPS–96–11, Michigan State University Dept. of Computer Science, http://web.cps.msu.edu/~crs/cps920/, submitted to IEEE Micro 3/96.

Mark Brehob, Travis Doom, Richard Enbody, William H. Moore, Sherry Q. Moore, Ron Sass, Charles Severance, Beyond RISC—The Post–RISC Architecture, Michigan State University Dept. of Computer Science, http://www.egr.msu.edu/~crs/papers/postrisc2/.

* cited by examiner

Primary Examiner—Eric Coleman
(74) Attorney, Agent, or Firm—Booth & Wright, LLP; Matthew J. Booth; Karen S. Wright

(57) ABSTRACT

A method and apparatus that minimizes instruction gaps behind a branch instruction in a multistage pipelined processor is disclosed. A pre-branch instruction that corresponds to a branch instruction to inserted into the instruction stream a sufficient number of instructions ahead of the branch instruction to insure that the pre-branch instruction exits the decode stage of the pipeline at the same time the branch instruction exits the first instruction fetch stage of the pipeline. The pre-branch instruction is decoded and causes the instruction fetch unit either to begin fetching instructions at a target address, where the branch is known or predicted to be taken, or to continue fetching instructions along the main execution path, the branch is known or predicted to be not taken.

32 Claims, 6 Drawing Sheets

| Cycle | Fetch Stages | | | Decode | Execution Stages | | Post-Ex | Comments |
|---|---|---|---|---|---|---|---|---|
| | F1 | F2 | F3 | D1 | E1 | E2 | PE | |
| 0 | L1.1 | | | | | | | |
| 1 | L1.2 | L1.1 | | | | | | |
| 2 | L1.3 | L1.2 | L1.1 | | | | | |
| 3 | L1.4 | L1.3 | L1.2 | L1.1 | | | | |
| 4 | L1.4½ | L1.4 | L1.3 | L1.2 | L1.1 | | | |
| 5 | L1.5 | L1.4½ | L1.4 | L1.3 | L1.2 | L1.1 | | Branch condition resolved |
| 6 | L1.6 | L1.5 | L1.4½ | L1.4 | L1.3 | L1.2 | L1.1 | |
| 7 | L1.7 | L1.6 | L1.5 | L1.4½ | L1.4 | L1.3 | L1.2 | Pre-branch instruction is decoded |
| 8 | L1.1 | L1.7 | L1.6 | L1.5 | L1.4½ | L1.4 | L1.3 | Branch target begins loading |
| 9 | L1.2 | L1.1 | L1.7 | L1.6 | L1.5 | L1.4½ | L1.4 | |
| 10 | L1.3 | L1.2 | L1.1 | L1.7 | L1.6 | L1.5 | L1.4½ | Branch instruction decoded, possible control break recognized |
| 11 | L1.4 | L1.3 | L1.2 | L1.1 | L1.7 | L1.6 | L1.5 | Branch begins execution |
| 12 | L1.4½ | L1.4 | L1.3 | L1.2 | L1.1 | L1.7 | L1.6 | Branch completed; branch target instructions begin executing |
| 13 | L1.5 | L1.4½ | L1.4 | L1.3 | L1.2 | L1.1 | L1.7 | Branch retired; next branch condition resolved |

| Address | Instruction | Comments |
|---|---|---|
| $L1: | | |
| L1.1 | cmplt.d r1, r11, r13 | #is this the last time through the loop? |
| L1.2 | sll.d r8, r11, 3 | #scale loop index i by 8 |
| L1.3 | add.d r11, r11, 1 | #increment loop index |
| L1.4 | load.d r10, (r14, r8) | #fetch a[i] |
| L1.5 | load.d r9, (r15, r8) | #fetch b[i] |
| L1.6 | fmadd.d r12, r9, r10 | #sum = sum + a[i] * b[i] |
| L1.7 | r1 ¦ branch $L1 | #loop back to L1 if not done |
| $L2: | | |
| L2.1 | sll.d r8, r11, 3 | |
| L2.2 | load.d r9, (r12, r8) | |
| L2.3 | add.d r11, r11, 1 | |

*FIG. 3*

| Cycle | Fetch Stages | | | Decode | Execution Stages | | Post-Ex | Comments |
|---|---|---|---|---|---|---|---|---|
| | F1 | F2 | F3 | D1 | E1 | E2 | PE | |
| 0 | L1.1 | | | | | | | |
| 1 | L1.2 | L1.1 | | | | | | |
| 2 | L1.3 | L1.2 | L1.1 | | | | | |
| 3 | L1.4 | L1.3 | L1.2 | L1.1 | | | | Branch condition resolved |
| 4 | L1.5 | L1.4 | L1.3 | L1.2 | L1.1 | | | |
| 5 | L1.6 | L1.5 | L1.4 | L1.3 | L1.2 | L1.1 | | |
| 6 | L1.7 | L1.6 | L1.5 | L1.4 | L1.3 | L1.2 | L1.1 | |
| 7 | L2.1 | L1.7 | L1.6 | L1.5 | L1.4 | L1.3 | L1.2 | |
| 8 | L2.2 | L2.1 | L1.7 | L1.6 | L1.5 | L1.4 | L1.3 | |
| 9 | L2.3 | L2.2 | L2.1 | L1.7 | L1.6 | L1.5 | L1.4 | Branch decoded; control break recognized |
| 10 | L1.1 | L2.3 | L2.2 | L2.1 | L1.7 | L1.6 | L1.5 | Branch target instructions begin loading |
| 11 | L1.2 | L1.1 | [L2.3] | [L2.2] | [L2.1]; idle | L1.7 | L1.6 | L2.1, L2.2, and L2.3 cancelled; execution stage idle |
| 12 | L1.3 | L1.2 | L1.1 | idle | idle | idle | L1.7 | execution stages idle |
| 13 | L1.4 | L1.3 | L1.2 | L1.1 | idle | idle | idle | execution stages idle |
| 14 | L1.5 | L1.4 | L1.3 | L1.2 | L1.1 | idle | idle | branch target enters execution stage |
| 15 | L1.6 | L1.5 | L1.4 | L1.3 | L1.2 | L1.1 | idle | |
| 16 | L1.7 | L1.6 | L1.5 | L1.4 | L1.3 | L1.2 | L1.1 | branch target retires |

*FIG. 4*

| Address | Instruction | Comments |
|---|---|---|
| $L1: | | |
| L1.1 | cmplt.d r1, r11, r13 | #is this the last time through the loop? |
| L1.2 | sll.d r8, r11, 3 | #scale loop index i by 8 |
| L1.3 | add.d r11, r11, 1 | #increment loop index |
| L1.4 | load.d r10, (r14, r8) | #fetch a[i] |
| L1.4 ½ | r1 ¦ branch.p $L1  *(400)* | #prebranch for L1.7 |
| L1.5 | load.d r9, (r15, r8) | #fetch b[i] |
| L1.6 | fmadd.d r12, r9, r10 | #sum = sum + a[i] * b[i] |
| L1.7 | r1 ¦ branch $L1 | #loop back to L1 if not done |
| $L2: | | |
| L2.1 | sll.d r8, r11, 3 | |
| L2.2 | load.d r9, (r12, r8) | |
| L2.3 | add.d r11, r11, 1 | |

*FIG. 5*

| Cycle | Fetch Stages | | | Decode | Execution Stages | | Post-Ex | Comments |
|---|---|---|---|---|---|---|---|---|
| | F1 | F2 | F3 | D1 | E1 | E2 | PE | |
| 0 | L1.1 | | | | | | | |
| 1 | L1.2 | L1.1 | | | | | | |
| 2 | L1.3 | L1.2 | L1.1 | | | | | |
| 3 | L1.4 | L1.3 | L1.2 | L1.1 | | | | |
| 4 | L1.4½ | L1.4 | L1.3 | L1.2 | L1.1 | | | |
| 5 | L1.5 | L1.4½ | L1.4 | L1.3 | L1.2 | L1.1 | | Branch condition resolved |
| 6 | L1.6 | L1.5 | L1.4½ | L1.4 | L1.3 | L1.2 | L1.1 | |
| 7 | L1.7 | L1.6 | L1.5 | L1.4½ | L1.4 | L1.3 | L1.2 | Pre-branch instruction is decoded |
| 8 | L1.1 | L1.7 | L1.6 | L1.5 | L1.4½ | L1.4 | L1.3 | Branch target begins loading |
| 9 | L1.2 | L1.1 | L1.7 | L1.6 | L1.5 | L1.4½ | L1.4 | |
| 10 | L1.3 | L1.2 | L1.1 | L1.7 | L1.6 | L1.5 | L1.4½ | Branch instruction decoded, possible control break recognized |
| 11 | L1.4 | L1.3 | L1.2 | L1.1 | L1.7 | L1.6 | L1.5 | Branch begins execution |
| 12 | L1.4½ | L1.4 | L1.3 | L1.2 | L1.1 | L1.7 | L1.6 | Branch completed; branch target instructions begin executing |
| 13 | L1.5 | L1.4½ | L1.4 | L1.3 | L1.2 | L1.1 | L1.7 | Branch retired; next branch condition resolved |

*FIG. 6*

METHOD AND APPARATUS FOR PRE-BRANCH INSTRUCTION

This application claims the benefit of the earlier filed U.S. Provisional Pat. App. Ser. No. 60/140,265, filed Jun. 18, 1999 (18.06.99), entitled "Method and Apparatus for Pre-Branch Instruction", which is incorporated by reference for all purposes into this specification

BACKGROUND OF THE INVENTION

1. Field of the Invention

The present invention relates to the handling of branch instructions in a computer having a multistage instruction pipeline. More specifically, the present invention is a method and apparatus to minimize processing delays caused by branch instructions.

2. Description of the Related Art

Computers are programmable calculating machines that execute algorithms under the control of instructions. All but the simplest algorithms require frequent decisions as to how they are to proceed, and these decisions affect the sequence of control instructions. Because control instructions are obtained in advance of the operations they perform, and because the decision as to how an algorithm is to proceed is a function of the operations, there is an unavoidable lag from the time when the decision is made to the time when operations following the decision begin. This time is often called the "branch penalty." Branch penalties can occur any time there is a break in the control flow of a program, such as occurs with conditional branches, unconditional jumps, indirect jumps, or return instructions.

Reduced instruction set computers, commonly referred to as RISC processors, are one of the more common computer architectures in use today. In a nutshell, RISC processors rely on simple, low level instructions of the same size. Instruction execution is broken up into various segments and processed in a multistage pipeline. The pipeline is structured such that multiple instructions may be processed at any given instant. For example, a five-stage pipeline may include separate stages for fetching an instruction from memory (instruction fetch stage), decoding the instruction (decode stage), fetching operands the instruction needs (operand fetch stage), executing the instruction (execution stage) and writing the results back to the appropriate register or memory location (write back stage). Up to five instructions can be processed at once in such a pipeline—one in each stage. Thus, such a RISC computer can theoretically achieve performance equivalent to executing one instruction each clock cycle.

However, the existence and frequency of branch instructions limits the ability of a pipelined processor such as the RISC processor described above to achieve such performance. In the absence of special handling of branch instructions, the earliest the processor could possibly recognize that the branch is to be taken is at the instruction decode stage. At this point, however, the next instruction has already been fetched and possibly other actions have been taken. Thus, the fetched instruction and other actions must be discarded and a new instruction (the branch target) must be fetched.

This problem is compounded in current processors for two reasons. First, branches are common occurrences. Studies have shown that branch instructions generally occur about as often as once every five to ten instructions. Second, many current processors employ superscalar architectures that include multiple parallel pipelines capable of fetching and executing four or more instructions concurrently. In superscalar processors, it is more likely that a branch will be encountered, because more instructions are fetched in every cycle.

One way that programmers have addressed the branch problem is to implement elaborate schemes to predict whether a branch is likely to be taken and then fetch the branch target address as the next instruction rather than the next sequential instruction as appropriate. If the branch is correctly predicted, no delay in execution occurs. Only when the branch is incorrectly predicted is a throughput penalty suffered.

Predictive techniques that are well known in the art include various branch direction prediction methodologies, either alone or coupled with branch target address prediction. Direction prediction is an attempt to guess which way a branch will go before the condition is resolved. For example, one popular way to predict branch direction is to record a history of the past behavior of the particular branch instruction and then assume that the next time the branch is encountered, the direction selected will be the direction most often selected in the past. Alternatively, some code developers merely make static assumptions regarding the likely direction of a branch, either with hint codes in the branch itself, or simply by assuming that forward branches will not be taken and backward branches will be taken (reflecting the looping nature of many programs.)

Target address prediction is more difficult than direction prediction because branches typically have only two directions (taken or not taken), but may have billions of possible target addresses. Developers often include target address caches and/or return address stacks to speed the determination of a branch target address. A target address cache is typically a large RAM that stores the branch address and the likely target address.

Originally, target address caches were used as a mechanism for direction prediction. When an instruction was fetched, the same address was offered to the branch target cache, and when there was a match, the next instruction was fetched using the target address in the branch target cache. More recently, target address caches have also included other information useful in branch prediction, particularly for superscalar architectures. However, target address caches behave well only when the code they are executing has good locality of reference in the prediction caches. They are also unable to provide useful prediction information when a branch is first encountered.

Given the possibility of mispredicting branches, code developers have taken other approaches to reduce branch penalty. For example, programmers may rely on the compiler to place one or more instructions after the branch that are to be executed regardless of whether or not the branch is evaluated as predicted. Such instructions are referred to as "delay slot" instructions because they are positioned in the slot or slots immediately following the branch instruction. If there is no appropriate instruction to place in the branch delay slots, one or more "no operation" instructions can be placed there instead. This technique is commonly referred to as "delayed branching," because instructions that relate to the branch are delayed by the instructions that appear in the delay slots. The idea behind delayed branching is that useful work can be accomplished during the processor cycles required to load instructions at the branch target into the pipeline. When delayed branching is used in combination with prediction, useful work can be accomplished during the time the processor takes to flush instructions for mispredicted branches and load the proper instructions into the pipeline.

While delayed branching is simple in concept, the implementation is complicated by two serious issues. The first relates to interruptability. If a branch is underway, there are actually two different program counters—the one being branched to and the one from which the delay slot instructions were taken, where instructions are still being executed. If an interrupt is taken, both of these instruction pointers must be saved, and upon return from the interrupt both must be restored and proper sequencing of the operations begun. The second is that the number of instructions migrated after the branch is usually fixed by the processor architecture. In the early MIPS and SPARC architectures, only one instruction could occupy the delay slot. More recent architectures may have four or more delay slots. In every case, however, the delay slots are architectural: they must be accounted for by code developers, even if they are occupied by no operation instructions. Determining appropriate instructions for multiple delay slots without using numerous "no operation" instructions, which impact processor performance, can quickly become a very complex problem, particularly where there may be multiple sequential branches in the space of a few instructions.

Accordingly, it would be highly desirable to process branches by implementing a delayed branching-type technique, combined with branch prediction techniques, but without being hampered by architecturally-dictated delay slot requirements and their accompanying interruptability issues. The present invention comprises a method and apparatus that can eliminate instruction gaps behind branch instructions in a multistage pipelined processor by employing a pre-branch instruction far enough ahead of each actual branch instruction. The pre-branch instruction technique is like delayed branching, in that some number of instructions behind the pre-branch instruction will still load and execute, accomplishing useful work. However, it is unlike delayed branching, because the number of instructions that execute between the pre-branch instruction and its corresponding actual branch is not architecturally fixed but rather, is a matter of design implementation. Similarly, because the pre-branch instruction is not an actual branch but rather an upstream "hint" that a branch is coming, the processor does not execute down two separate paths after the pre-branch instruction. Therefore, using a pre-branch instruction does not raise the interrupt and program counter issues that are inherently problematic in delayed branching.

The pre-branch instruction is placed at the point in the instruction stream where it will be at the decode stage in the pipeline while its corresponding branch instruction is at the first fetch stage in the pipeline. In the case of conditional branches, the pre-branch instruction states the condition upon which the branch depends. In a preferred embodiment, the pre-branch instruction also includes one or more prediction bits that indicate whether the branch is predicted to be taken or not taken. The pre-branch instruction is then decoded, and if the condition upon which the branch depends is known and dictates that the branch will be taken or if the condition is not known but the branch is predicted to be taken, the instruction fetch unit begins to fetch instructions at the branch target. If the condition is known and dictates that the branch will not be taken, or if the condition is not known but the branch is predicted to be not taken, then the instruction fetch unit continues to fetch instructions along the main execution path. If the pre-branch instruction has been properly placed in the instruction stream, there will be no gap in the instruction stream behind the branch instruction, for all conditional branches whose conditions are known at the time that th& pre-branch is decoded, and for all branches whose direction is correctly predicted. It is only when a branch's conditions are unknown and its direction is mispredicted that a gap in the instruction stream can occur while the mispredicted instructions are cancelled and the instruction fetch unit is redirected to load the correct instructions into the execution pipeline.

SUMMARY

The present invention comprises a method and apparatus that can eliminate instruction gaps behind branch instructions in a multistage pipelined processor by employing a pre-branch instruction far enough ahead of each actual branch instruction. The pre-branch instruction is placed at the point in the instruction stream where it will be at the decode stage in the pipeline while its corresponding branch instruction is at the first instruction fetch stage in the pipeline. In the case of conditional branches, the pre-branch instruction states the condition upon which the branch depends. In a preferred embodiment, the pre-branch instruction also includes one or more prediction bits that indicate whether the branch is predicted to be taken or not taken. The pre-branch instruction is then decoded. If the condition upon which the branch depends is known and dictates that the branch will be taken, or if the condition is not known but the branch is predicted to be taken, the instruction fetch unit begins to fetch instructions at the branch target. If the condition is known and dictates that the branch will not be taken, or if the condition is not known but the branch is predicted to be not taken, then the instruction fetch unit continues to fetch instructions along the main execution path. If the pre-branch instruction has been properly placed in the instruction stream, there will be no gap in the instruction stream behind the branch instruction, for all conditional branches whose conditions are known at the time that the pre-branch is decoded, and for all branches whose direction is correctly predicted. It is only when a branch's conditions are unknown and its direction is mispredicted that a gap in the instruction stream can occur while the mispredicted instructions are cancelled and the instruction fetch unit is redirected to load the correct instructions into the execution pipeline.

BRIEF DESCRIPTION OF THE DRAWINGS

To further aid in understanding the invention, the attached drawings help illustrate specific features of the invention and the following is a brief description of the attached drawings:

FIG. 3 is an example code sequence that contains a branch instruction.

FIG. 4 shows the progression of the example code sequence of FIG. 3 through a typical instruction pipeline.

FIG. 5 is the example code sequence from FIG. 3, wherein a pre-branch instruction according to an embodiment of the present invention has been inserted.

FIG. 6 illustrates the progression of the example code sequence of FIG. 5 through a typical instruction pipeline.

DETAILED DESCRIPTION OF THE INVENTION

The present invention comprises a method and apparatus that can eliminate instruction gaps behind branch instructions in a multistage pipelined processor by employing a pre-branch instruction far enough ahead of each actual branch instruction. This disclosure describes numerous specific details that include specific structures, processor architectures, and example instruction streams in order to provide a thorough understanding of the present invention. One skilled in the art will appreciate that one may practice the present invention without these specific details.

The pre-branch instruction is a hint that is placed at the point in the instruction stream where it will be at the decode stage in the instruction pipeline while its corresponding branch instruction is at the first instruction fetch stage in the pipeline. In the case of conditional branches, the pre-branch instruction states the condition upon which the branch depends. In a preferred embodiment, the pre-branch instruction also includes one or more direction prediction bits that indicate whether the branch is predicted to be taken or not taken. The pre-branch instruction is then decoded. If the condition upon which the branch depends is known and dictates that the branch will be taken, or if the condition is not known but the branch is predicted to be taken, the instruction fetch unit begins to fetch instructions at the branch target. If the condition is known and dictates that the branch will not be taken, or if the condition is not known but the branch is predicted to be not taken, then the instruction fetch unit continues to fetch instructions along the main execution path. If the pre-branch instruction has been properly placed in the instruction stream, there will be no gap in the instruction stream behind the branch instruction, for all conditional branches whose conditions are known at the time that the pre-branch is decoded, and for all branches whose direction is correctly predicted. It is only when a branch's conditions are unknown and its direction is mispredicted that a gap in the instruction stream can occur while the mispredicted instructions are cancelled and the instruction fetch unit is redirected to load the correct instructions into the execution pipeline.

Figure 1:
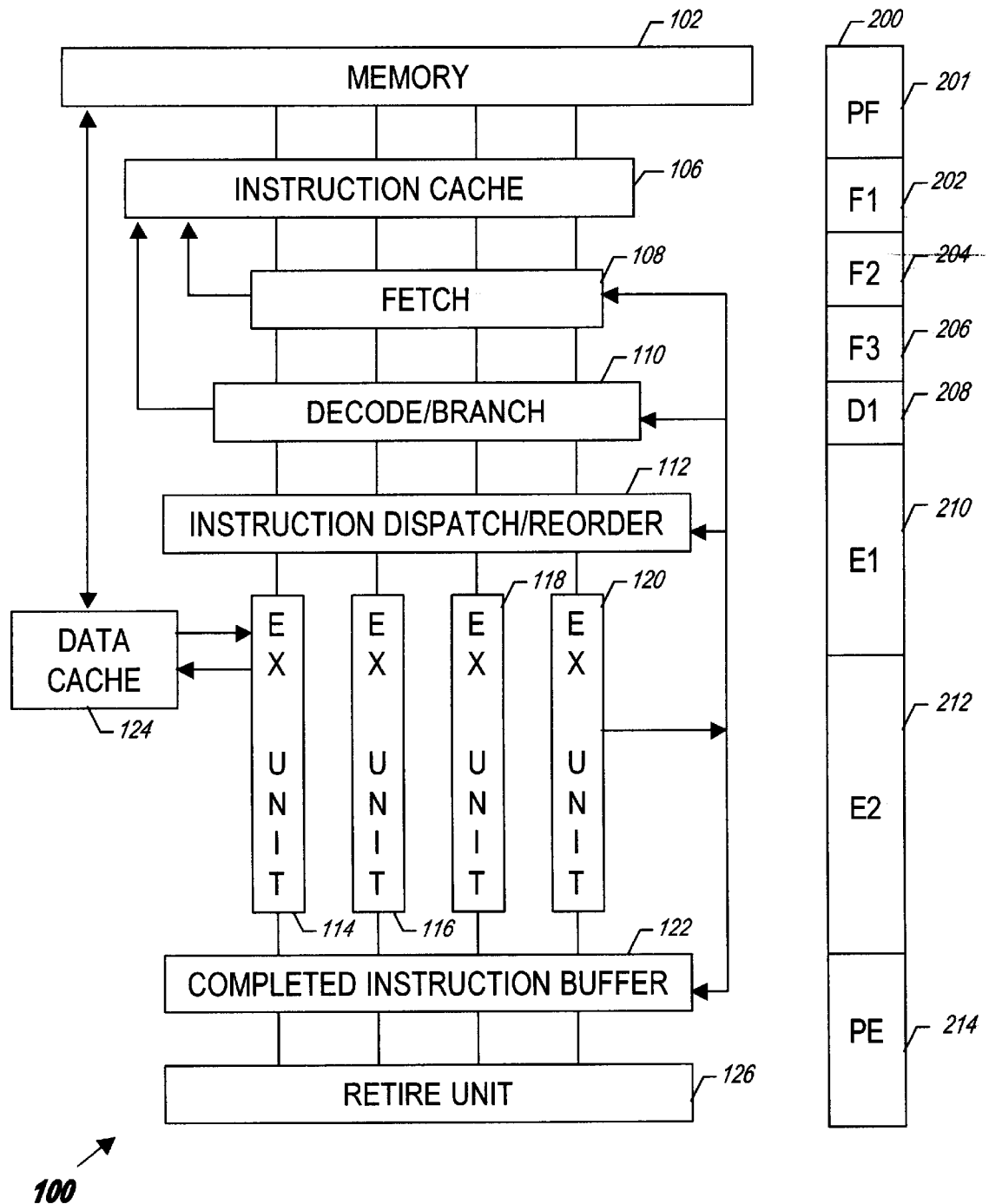
FIG. 1 is a block diagram showing a typical current processor architecture with its associated instruction pipeline stages.

FIG. 1 is a block diagram showing a typical processor architecture 100 with its associated instruction pipeline 200. Those skilled in the art will understand that the architecture shown in FIG. 1 is intended to show a typical architecture employed by a generic modern-day processor, and is not intended to imply any architectural requirement or limitation of the present invention. The present invention can be practiced to enhance the performance of any pipelined processor, with either more or fewer functional units than those shown in FIG. 1.

Processor architecture 200 includes memory 102, an instruction cache 106, an instruction fetch unit 108, a decode unit 110, an instruction dispatch/reorder buffer 112, execution units 114, 116, 118, and 120, a completed instruction buffer 122, a data cache 124, and a retire unit 126. Instruction pipeline 200 includes one or more pre-fetch stages 201, three instruction cache fetch stages 202, 204, and 206, a decode stage 208, two execution stages 210 and 212, and one or more post-execution stages 214. During the pre-fetch stages 201, instructions are fetched from memory 102, potentially predecoded, and placed into the instruction cache 106. In the three fetch stages 202, 204, and 206, instructions are fetched from the instruction cache 106 and supplied to the instruction decoder 110 for the decode stage 208.

During the decode stage 208, instructions are decoded and branch predictions are performed. At the end of the decode stage 208, the processor will have decided whether a branch will likely be taken and if so, the likely branch target address. This information is then provided back to the instruction fetch unit 108, so that it can fetch instructions at the branch target address and enter them into the pipeline 200.

After decoding, the instructions are placed into an instruction dispatch and reorder buffer 112, where they are queued for dispatch to an execution unit. Instructions are dispatched for execution when their input values are available, an output register is available, and an execution unit is available. Execution units 114, 116, 118, and 120 may be generic execution units, or may be dedicated for certain tasks. For example, execution unit 114 may be dedicated for load/store operations into and out of the data cache. Execution unit 116 may be an integer arithmetic unit, execution unit 118 may be a floating point unit, and execution unit 120 may be dedicated to branch instructions. Those skilled in the art will understand that the use of four execution units, or the use of a dedicated execution unit for branch instructions in the example processor architecture shown in FIG. 1 is not intended to imply a requirement or a limitation of the present invention.

After instructions complete execution during the second execution stage 212, they enter the post-execution stage 214. The post-execution stage 214 may be comprised of several more stages where, for example, instructions are reordered and either cancelled or retired, tag checks for cache management are performed, and results are written back to register files. Those skilled in the art are generally familiar with the types of operations performed by pipelined processors after instructions are executed.

The present invention is a method and apparatus for handling branch instructions to minimize branch penalties that can occur during the fetch, decode, and execute stages of the pipeline 200. As the present invention does not relate to pre-fetch operations occurring during the pre-fetch stages 201, or post-execution operations occurring during the post-execution stages 214, no further detail concerning pre-fetch operations during the pre-fetch stage 201 or post-execution operations during the post-execution stage 214 is provided herein.

Figure 2:
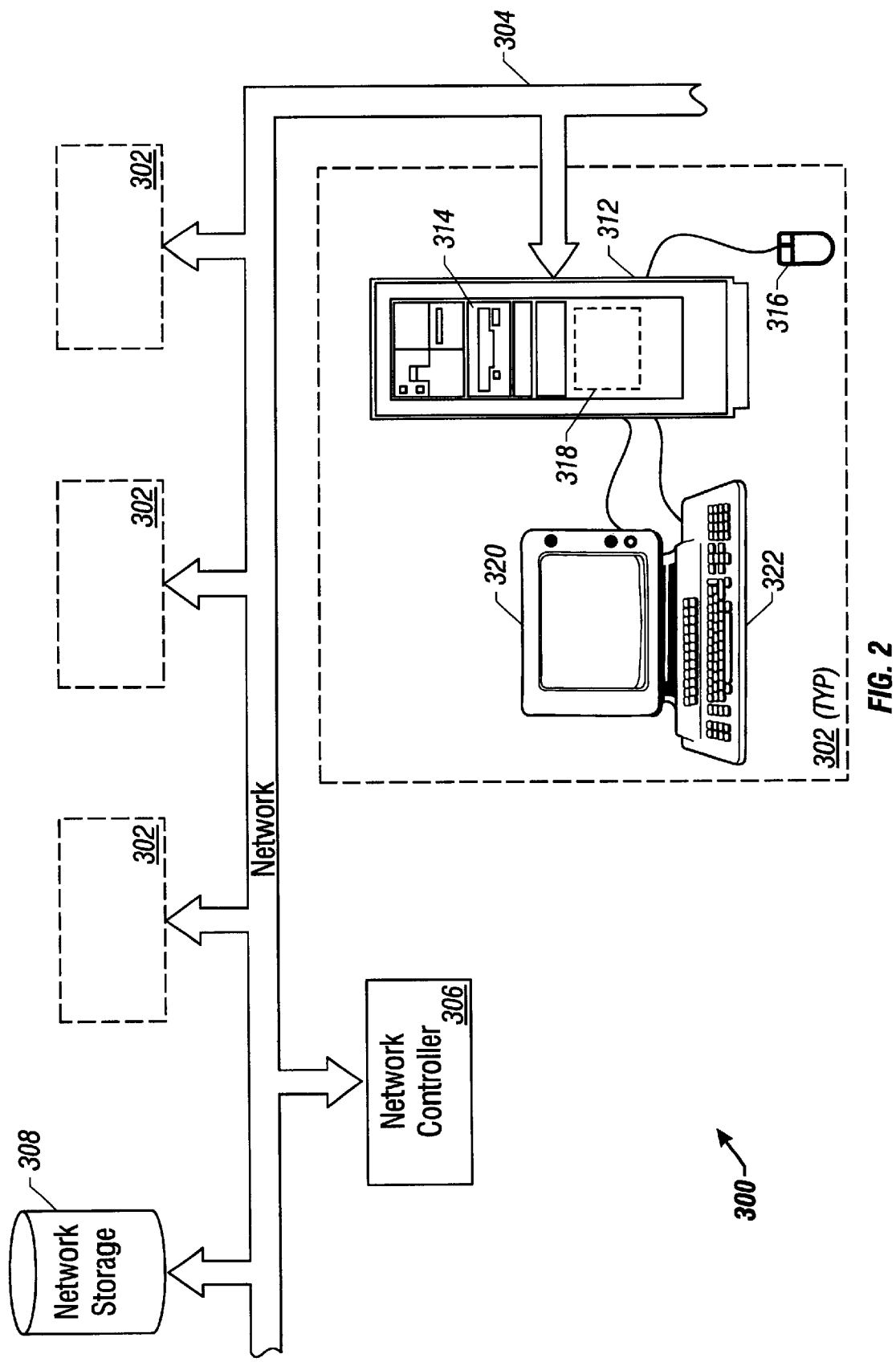
FIG. 2 shows a typical networked computer environment.

Processors having architectures similar to that shown in FIG. 1 are used in computer workstations which may be arranged in a typical network similar to that shown in FIG. 2. FIG. 2 shows a typical network 300, which includes one or more computer workstations 302 networked together via a network connection 304, which is controlled by a network controller 306. The network 300 may also include various peripheral devices, such as a network storage device 308 and one or more printers (not shown in FIG. 2). Typical computer workstation 302 includes a computer 312, internal storage media such as RAM 318, external storage media such as a floppy disk 314, and various interface devices such as a mouse 316, a monitor 320, and a keyboard 322. The pre-branch instruction that is the present invention can be utilized in typical computer software that runs on computer workstations such as that shown in FIG. 2, in either a networked configuration as shown, or in a standalone configuration. In addition, the method of generating the pre-branch instruction and inserting it into computer software during the development of the computer software can be practiced on software development computer workstations similar to that shown in FIG. 2, either in a networked configuration as shown, or in a standalone configuration.

FIG. 3 is an example code sequence wherein the present invention can be applied. In the code sequence shown in FIG. 3, the instruction at address L1.7 is a conditional branch instruction. If rl is true (logical 1) then program control branches back to the address at L1.1, and the L1 loop repeats itself. If rl is false (logical 0), then the branch is not executed, and program control continues sequentially to the next loop. FIG. 4 shows how this code would proceed through the fetch, decode, and execution stages 202–212 of the sample instruction pipeline 200 shown in FIG. 1. As shown in FIG. 4, during processor cycles 11 through 14, one or more of the execution units sits idle when the L1 loop is to be repeated, due to a three-instruction gap in the instruction stream caused by canceling instructions L2.1, L2.2, and L2.3 after the branch instruction at L1.7 is decoded.

FIGS. 5 and 6 show how the present invention can be applied to the sample code sequence in FIG. 3 to eliminate the instruction gap in the pipeline 200. FIG. 5 shows the FIG. 3 code sequence, with the addition of a pre-branch instruction 400 at address L1.4½. In one embodiment, the pre-branch instruction 400 is simply a restatement of the branch instruction, with an additional "pre-branch" bit set (indicated in FIG. 5 as a ".p" suffix to the branch instruction), that allows the processor to interpret the instruction as a pre-branch instruction and not an actual branch. The pre-branch instruction 400 has been carefully located in the instruction sequence to insure that no gaps occur in the instruction stream when the instructions are processed through the pipeline. In the case of the example pipeline 200, one instruction is processed at each stage during every processor cycle, and there are three stages before the decode stage. Therefore, the pre-branch instruction 400 is placed to insure that three instructions along the main execution path will load after the pre-branch instruction 400 loads, wherein the branch instruction is the last instruction to load along the main execution path.

FIG. 6 shows how the FIG. 5 instruction sequence proceeds through the example instruction pipeline 200. In FIG. 6, the pre-branch instruction is decoded during processor cycle 7. The branch condition is known when the pre-branch instruction is decoded, because the branch condition instruction L1.1 has already executed. Therefore, after the pre-branch instruction is decoded, the processor "knows" that there is an upcoming control break, and begins to load instructions at the branch target address. The result is that there is no instruction gap after the branch instruction, and when it is decoded, the next instruction in the pipeline is the branch target.

FIGS. 5 and 6 show the case where the branch condition is placed far enough ahead of the pre-branch instruction to insure that the branch condition is known when the pre-branch instruction is decoded. Those skilled in the art will recognize that there may be occasions where the condition is not known at the time the pre-branch instruction is decoded. For example, the condition may be included in the pre-branch instruction or may be at instruction L1.4, which has not executed when the pre-branch instruction is decoded. In that case, the branch prediction mechanisms described above can be employed with the pre-branch instruction, such that when the pre-branch instruction is decoded, the branch resolution is predicted and the instruction fetch unit begins to fetch instructions at the branch target (where the branch is predicted to be taken) or continues to fetch instructions along the main execution path (where the branch is predicted to be not taken.) When the prediction is correct, the resulting instruction stream will have no gaps, as shown in FIG. 6. On the other hand, if the branch direction is incorrectly predicted or the branch target address is incorrectly predicted, instructions at the wrong address will be loaded into the pipeline by the instruction fetch unit, and must be canceled at some point in the pipeline. One way to insure that mispredicted instructions in the pipeline are canceled is include an address check in the instruction dispatch/reorder buffer that checks instruction addresses before dispatching them to execution units. Those skilled in the art will recognize that there are many alternative approaches to insure that program control through branches remains on-track and that mispredicted instructions (or the executed results of mispredicted instructions) are canceled at some point before they are retired.

Those of ordinary skill in the art will also recognize that some pipelined processors do not process instructions at the rate of one instruction per stage per processor cycle, and that the instruction processing rate will affect the determination of where to place the pre-branch instruction to achieve the most efficient processor performance. For example, there are current processors with architectures that allow them to issue instructions at variable rates, up to four or six instructions per cycle. These processors typically also fetch instructions in groups. In these cases, the pre-branch instruction would need to be placed farther "upstream" of the actual branch to minimize instruction gaps in the pipeline, depending upon the number of instructions fetched per cycle, the rate at which the instructions progress through the pipeline, and the number of pipeline stages before the decode stage. Even in very wide issue processors, using a pre-branch instruction before actual program branches can improve performance by minimizing the frequency and duration of instruction gaps behind branch instructions.

Pre-branch instructions can be manually inserted into code sequences by a code developer, after determining the proper location for the pre-branch, or they can be inserted automatically by a software development tool programmed to include pre-branch instructions, or they could be inserted by a compiler, when a program is compiled. Those skilled in the art will recognize, after reading this specification and/or practicing the present invention, that there may be other ways to incorporate pre-branch instructions into computer programs.

To summarize, the present invention comprises a method and apparatus that can eliminate instruction gaps behind branch instructions in a multistage pipelined processor by employing a pre-branch instruction far enough ahead of each actual branch instruction. The pre-branch instruction is placed at the point in the instruction stream where it will be at the decode stage in the pipeline while its corresponding branch instruction is at the first instruction fetch stage in the pipeline. In the case of conditional branches, the pre-branch instruction states the condition upon which the branch depends. In a preferred embodiment, the pre-branch instruction also includes one or more prediction bits that indicate whether the branch is predicted to be taken or not taken. The pre-branch instruction is then decoded. If the condition upon which the branch depends is known and dictates that the branch will be taken, or if the condition is not known but the branch is predicted to be taken, the instruction fetch unit begins to fetch instructions at the branch target. If the condition is known and dictates that the branch will not be taken, or if the condition is not known but the branch is predicted to be not taken, then the instruction fetch unit continues to fetch instructions along the main execution path. If the pre-branch instruction has been properly placed in the instruction stream, there will be no gap in the instruction stream behind the branch instruction, for all conditional branches whose conditions are known at the time that the pre-branch is decoded, and for all branches whose direction is correctly predicted. It is only when a branch's conditions are unknown and its direction is mispredicted that a gap in the instruction stream can occur while the mispredicted instructions are canceled and the instruction fetch unit is redirected to load the correct instructions into the execution pipeline.

Other embodiments of the invention will be apparent to those skilled in the art after considering this specification or practicing the disclosed invention. The specification and examples above are exemplary only, with the true scope of the invention being indicated by the following claims.

We claim the following invention:

1. An apparatus that minimizes instruction gaps behind a branch instruction processed in a multistage pipelined processor that includes an instruction fetch unit that fetches instructions during one or more instruction fetch stages, one or more instruction decode stages, and one or more execution stages, comprising:

a pre-branch instruction that corresponds to a branch instruction, said pre-branch instruction is placed a sufficient number of instructions ahead of said branch instruction to insure that said pre-branch instruction exits the decode stage of the pipeline at the same time that said branch instruction exits the first instruction fetch stage of said pipeline, said pre-branch instruction comprises a branch instruction and one or more bits that identify the pre-branch instruction as a pre-branch instruction, said pre-branch instruction is decoded by the processor and causes the instruction fetch unit either to begin fetching instructions at a branch target address or to continue fetching instructions along the main execution path.

2. The apparatus of claim 1, wherein decoding said pre-branch instruction further comprises predicting that a branch corresponding to said branch instruction will be taken or not taken, or determining from a known condition that said branch will be taken or not taken.

3. The apparatus of claim 2, wherein predicting that said branch will be taken or not taken further comprises predicting a branch target address.

4. The apparatus of claim 2, further comprising an instruction to resolve the branch condition located a sufficient number of instructions ahead of said pre-branch instruction to insure that said instruction to resolve the branch condition is executed before said pre-branch instruction enters the decode stage of the pipeline.

5. The apparatus of claim 2 wherein said branch instruction is decoded, said branch instruction decoding includes verifying that instructions loaded by the instruction fetch unit after decoding said pre-branch instruction are the correct instructions based upon the resolution of the branch condition.

6. The apparatus of claim 5, wherein said branch instruction decoding further includes cancelling instructions in the pipeline after said branch instruction when said instructions are determined to be the wrong instructions by said verification.

7. An instruction system that minimizes instruction gaps behind a branch instruction processed in a multistage pipelined processor that includes an instruction fetch unit that fetches instructions during one or more instruction fetch stages, one or more instruction decode stages, and one or more execution stages, comprising:

a pre-branch instruction that corresponds to a branch instruction, said pre-branch instruction is placed a sufficient number of instructions ahead of said branch instruction to insure that said pre-branch instruction exits the decode stage of the pipeline at the same time that said branch instruction exits the first instruction fetch stage of said pipeline, said pre-branch instruction comprises a branch instruction and one or more bits that identify the pre-branch instruction as a pre-branch instruction, said pre-branch instruction is decoded by the processor and causes the instruction fetch unit either to begin fetching instructions at a branch target address or to continue fetching instructions along the main execution path.

8. The system of claim 7, wherein decoding said pre-branch instruction further comprises predicting that a branch corresponding to said branch instruction will be taken or not taken, or determining from a known condition that said branch will be taken or not taken.

9. The system of claim 8, wherein predicting that said branch will be taken or not taken further comprises predicting a branch target address.

10. The system of claim 8, further comprising an instruction to resolve the branch condition located a sufficient number of instructions ahead of said pre-branch instruction to insure that said instruction to resolve the branch condition is executed before said pre-branch instruction enters the decode stage of the pipeline.

11. The system of claim 8 wherein said branch instruction is decoded, said branch instruction decoding includes verifying that instructions loaded by the instruction fetch unit after decoding said pre-branch instruction are the correct instructions based upon the resolution of the branch condition.

12. The system of claim 11, wherein said branch instruction decoding further includes cancelling instructions in the pipeline after said branch instruction when said instructions are determined to be the wrong instructions by said verification.

13. A method of making a branch instruction processing system that minimizes instruction gaps behind a branch instruction processed in a multistage pipelined processor that includes an instruction fetch unit that fetches instructions during one or more instruction fetch stages, one or more instruction decode stages, and one or more execution stages, comprising:

providing a pre-branch instruction that corresponds to a branch instruction, said pre-branch instruction is placed a sufficient number of instructions ahead of said branch instruction to insure that said pre-branch instruction exits the decode stage of the pipeline at the same time that said branch instruction exits the first instruction fetch stage of said pipeline, said pre-branch instruction comprises a branch instruction and one or more bits that identify the pre-branch instruction as a pre-branch instruction, said pre-branch instruction is decoded by the processor and causes the instruction fetch unit either to begin fetching instructions at a branch target address or to continue fetching instructions along the main execution path.

14. The method of claim 13, wherein decoding said pre-branch instruction further comprises predicting that a branch corresponding to said branch instruction will be taken or not taken, or determining from a known condition that said branch will be taken or not taken.

15. The method of claim 14, wherein predicting that said branch will be taken or not taken further comprises predicting a branch target address.

16. The method of claim 14, further comprising providing an instruction to resolve the branch condition located a sufficient number of instructions ahead of said pre-branch instruction to insure that said instruction to resolve the branch condition is executed before said pre-branch instruction enters the decode stage of the pipeline.

17. The method of claim 14 wherein said branch instruction is decoded, said branch instruction decoding includes verifying that instructions loaded by the instruction fetch unit after decoding said pre-branch instruction are the correct instructions based upon the resolution of the branch condition.

18. The method of claim 17, wherein said branch instruction decoding further includes cancelling instructions in the pipeline after said branch instruction when said instructions are determined to be the wrong instructions by said verification.

19. A method of using an instruction to minimize instruction gaps behind a branch instruction in a multistage pipelined processor that includes an instruction fetch unit that fetches instructions during one or more instruction fetch stages, one or more instruction decode stages, and one or more execution stages, comprising:
   estimating the number of processor cycles required to fetch and decode a branch instruction to determine or predict a branch direction and a branch target address;
   determining the number of instructions that correspond to said number of processor cycles, and inserting a pre-branch instruction that corresponds to said branch instruction a sufficient number of instructions ahead of said branch instruction to insure that said pre-branch instruction exits the decode stage of the pipeline at the same time that said branch instruction exits the first instruction fetch stage of said pipeline, said pre-branch instruction further comprises a branch instruction and one or more bits that identify said pre-branch instruction as a pre-branch instruction.

20. The method of claim 19, wherein said branch instruction is a conditional branch instruction, and further comprising inserting an instruction to resolve the branch condition a sufficient number of instructions ahead of said pre-branch instruction to insure that said instruction to resolve the branch condition is executed before said pre-branch instruction enters the decode stage of the pipeline.

21. A program storage device readable by a computer that tangibly embodies a program of instructions executable by the computer to perform a method of using an instruction to minimize instruction gaps behind a branch instruction in a multistage pipelined processor that includes an instruction fetch unit that fetches instructions during one or more instruction fetch stages, one or more instruction decode stages, and one or more execution stages, comprising:
   estimating the number of processor cycles required to fetch and decode a branch instruction to determine or predict a branch direction and a branch target address;
   determining the number of instructions that correspond to said number of processor cycles, and
   inserting a pre-branch instruction that corresponds to said branch instruction a sufficient number of instructions ahead of said branch instruction to insure that said pre-branch instruction exits the decode stage of the pipeline at the same time that said branch instruction exits the first instruction fetch stage of said pipeline, said pre-branch instruction further comprises a branch instruction and one or more bits that identify said pre-branch instruction as a pre-branch instruction.

22. The program storage device of claim 21, wherein said branch instruction is a conditional branch instruction, and said method further comprises inserting an instruction to resolve the branch condition a sufficient number of instructions ahead of said pre-branch instruction to insure that said instruction to resolve the branch condition is executed before said pre-branch instruction enters the decode stage of the pipeline.

23. A processing method that minimizes instruction gaps behind a branch instruction in a multistage pipelined processor that includes an instruction fetch unit that fetches instructions during one or more instruction fetch stages, one or more instruction decode stages, and one or more execution stages, comprising:
   loading a pre-branch instruction into the processor instruction pipeline, said pre-branch instruction corresponds to a branch instruction, said pre-branch instruction comprises said branch instruction and one or more bits that identify the pre-branch instruction as a pre-branch instruction, said pre-branch instruction is placed a sufficient number of instructions ahead of said branch instruction to insure that said pre-branch instruction exits the decode stage of the pipeline at the same time that said branch instruction exits the first instruction fetch stage of said pipeline, and
   decoding said pre-branch instruction during the decode stage to cause the instruction fetch unit either to begin fetching instructions at a branch target address or to continue fetching instructions along the main execution path.

24. The method of claim 23, wherein decoding said pre-branch instruction further comprises predicting that a branch corresponding to said branch instruction will be taken or not taken, or determining from a known condition that said branch will be taken or not taken.

25. The method of claim 24, wherein predicting that said branch will be taken or not taken further comprises predicting a branch target address.

26. The method of claim 24 further comprising decoding said branch instruction, said branch instruction decoding includes verifying that instructions loaded by the instruction fetch unit after decoding said pre-branch instruction are the correct instructions based upon the resolution of the branch condition.

27. The method of claim 26, wherein said branch instruction decoding further includes cancelling instructions in the pipeline after said branch instruction when said instructions are determined to be the wrong instructions by said verification.

28. A program storage device readable by a computer that tangibly embodies a program of instructions executable by the computer to perform a method of processing branch instructions that minimizes instruction gaps behind a branch instruction in a multistage pipelined processor that includes an instruction fetch unit that fetches instructions during one or more instruction fetch stages, one or more instruction decode stages, and one or more execution stages, comprising:
   loading a pre-branch instruction into the processor instruction pipeline, said pre-branch instruction corresponds to a branch instruction, said pre-branch instruction comprises said branch instruction and one or more bits that identify the pre-branch instruction as a pre-branch instruction, said pre-branch instruction is placed a sufficient number of instructions ahead of said branch instruction to insure that said pre-branch instruction exits the decode stage of the pipeline at the same time that said branch instruction exits the first instruction fetch stage of said pipeline, and
   decoding said pre-branch instruction during the decode stage to cause the instruction fetch unit either to begin fetching instructions at a branch target address or to continue fetching instructions along the main execution path.

29. The program storage device of claim 28, wherein said decoding said pre-branch instruction further comprises predicting that a branch corresponding to said branch instruction will be taken or not taken, or determining from a known condition that said branch will be taken or not taken.

30. The program storage device of claim 29, wherein said predicting that said branch will be taken or not taken further comprises predicting a branch target address.

31. The program storage device of claim 29, wherein said method further comprises decoding said branch instruction, said branch instruction decoding includes verifying that instructions loaded by the instruction fetch unit after decoding said pre-branch instruction are the correct instructions based upon the resolution of the branch condition.

32. The program storage device of claim 31, wherein said branch instruction decoding further includes cancelling instructions in the pipeline after said branch instruction when said instructions are determined to be the wrong instructions by said verification.

\* \* \* \* \*